(12) United States Patent
Schröter

(10) Patent No.: US 11,920,713 B2
(45) Date of Patent: Mar. 5, 2024

(54) COUPLING

(71) Applicant: Fränkische Industrial Pipes GMBH & CO. KG, Königsberg (DE)

(72) Inventor: Sören Schröter, Viereth-Trunstadt (DE)

(73) Assignee: FRÄNKISCHE INDUSTRIAL PIPES GMBH & CO. KG, Königsberg (DE)

( * ) Notice: Subject to any disclaimer, the term of this patent is extended or adjusted under 35 U.S.C. 154(b) by 350 days.

(21) Appl. No.: 17/293,334

(22) PCT Filed: Nov. 20, 2019

(86) PCT No.: PCT/EP2019/081884
§ 371 (c)(1),
(2) Date: May 12, 2021

(87) PCT Pub. No.: WO2020/104504
PCT Pub. Date: May 28, 2020

(65) Prior Publication Data
US 2022/0010904 A1    Jan. 13, 2022

(30) Foreign Application Priority Data
Nov. 21, 2018 (DE) ...................... 10 2018 219 932.9

(51) Int. Cl.
*F16L 37/084* (2006.01)
*F16L 37/14* (2006.01)

(52) U.S. Cl.
CPC ......... *F16L 37/0841* (2013.01); *F16L 37/144* (2013.01)

(58) Field of Classification Search
CPC ...... F16L 37/0841; F16L 37/02; F16L 37/144
See application file for complete search history.

(56) References Cited

U.S. PATENT DOCUMENTS 5,499,848 A    3/1996  Kujawski
10,047,889 B2  8/2018  Chaupin et al.
(Continued)

FOREIGN PATENT DOCUMENTS

CN    104847992 A    8/2015
CN    107408780 A    11/2017
(Continued)

OTHER PUBLICATIONS

European Application No. 19808744.7, "Office Action", dated May 2, 2023, 5 pages.
(Continued)

*Primary Examiner* — Matthew Troutman
*Assistant Examiner* — James A Linford
(74) *Attorney, Agent, or Firm* — Kilpatrick Townsend & Stockton LLP

(57) ABSTRACT

A coupling comprising a receiving element, a securing element, a retaining element and an insertion element, wherein the securing element is adapted to be displaceable between a release position and a locking position along a displacement axis, the securing element being adapted to engage the at least one retaining element in such a manner that a displacement of the securing element from the release position in the direction of the locking position is prevented, and wherein the insertion element is adapted to interact with the at least one retaining element upon insertion of the insertion element into the receiving space of the receiving element in such a way that a displacement of the securing element from the release position into the locking position is enabled.

15 Claims, 7 Drawing Sheets

(56) References Cited

U.S. PATENT DOCUMENTS

| | | | |
|---|---|---|---|
| 10,247,340 B2 | 4/2019 | Arnold et al. | |
| 2004/0094956 A1 | 5/2004 | Lacroix et al. | |
| 2012/0211977 A1 | 8/2012 | Callahan et al. | |
| 2013/0127159 A1 | 5/2013 | Honda et al. | |
| 2014/0353961 A1* | 12/2014 | Milhas | F16L 37/086 285/82 |
| 2015/0145243 A1 | 5/2015 | Dude | |
| 2016/0298800 A1 | 10/2016 | Gocha et al. | |
| 2017/0067588 A1 | 3/2017 | Chaupin et al. | |
| 2017/0152980 A1 | 6/2017 | Klein et al. | |
| 2018/0017197 A1 | 1/2018 | Meister et al. | |
| 2020/0149670 A1 | 5/2020 | Wehrmann | |

FOREIGN PATENT DOCUMENTS

| | | | |
|---|---|---|---|
| DE | 19809313 C1 | 8/1999 | |
| DE | 102012013305 A1 | 1/2014 | |
| DE | 102014105165 A1 | 10/2015 | |
| DE | 102014107655 A1 | 12/2015 | |
| DE | 102016109051 A1 | 4/2017 | |
| EP | 0280180 A2 | 8/1988 | |
| EP | 0280180 A3 | 11/1988 | |
| EP | 0961070 A2 | 12/1999 | |
| EP | 0961070 A3 | 7/2000 | |
| EP | 1422461 A1 | 5/2004 | |
| EP | 2937614 A1 | 10/2015 | |
| EP | 3077718 A1 | 10/2016 | |
| FR | 3021386 A1 | 11/2015 | |
| WO | WO-9427077 A1 * | 11/1994 | F16L 37/0841 |
| WO | WO-2007066675 A1 * | 6/2007 | F16L 37/088 |
| WO | WO-2012109231 A2 * | 8/2012 | F16L 37/02 |
| WO | 2015084782 A1 | 6/2015 | |
| WO | WO-2018159201 A1 * | 9/2018 | F16L 21/045 |

OTHER PUBLICATIONS

German Application No. DE102018220521.3, dated Search Report, Jan. 24, 2020, 7 pages.
International Application No. PCT/EP2019/081884, International Search Report and Written Opinion, dated Jan. 27, 2020, 10 pages.
International Application No. PCT/EP2019/082238, International Search Report and Written Opinion, dated Feb. 24, 2020, 12 pages.
Chinese Application No. 201980076950.3, Office Action dated Jun. 27, 2022, 8 pages.
German Application No. DE102018219932.9, Search Report, dated Jan. 22, 2020, 8 pages.
U.S. Appl. No. 17/294,605, "Non-Final Office Action", dated Jul. 14, 2023, 13 pages.

* cited by examiner

COUPLING

CROSS-REFERENCE TO RELATED APPLICATION

This application is a U.S. national phase of International Patent Application No. PCT/EP2019/081884 filed on Nov. 20, 2019, which claims priority to German Patent Application No. 10 2018 219 932.9, filed in Germany on Nov. 21, 2018. The entire contents of both applications are hereby incorporated herein by this reference.

The present invention relates to a coupling which is used, for example, to connect fluid lines in order to securely fasten these fluid lines together.

When two fluid lines are connected to one another in such a way that fluid is transferred from one line to the other line, it is usual to insert one end of one line into one end of the other line. It often happens that, for example, due to friction effects on sealing elements, the two ends of the fluid lines that are fitted together appear to be correctly connected, but are not, and can thus become detached from one another during use.

It is therefore the object of the present invention to provide a coupling that ensures a reliable and secure connection, for example between two fluid lines.

This task is solved by a coupling comprising a receiving element, a securing element, at least one retaining element formed separately from the securing element, and an insertion element, the insertion element being insertable along an insertion axis into a receiving space of the receiving element, the securing element being adapted to be displaceable along a displacement axis between a release position and a locking position, the securing element being adapted in its release position to be in engagement with the at least one retaining element without the insertion element being inserted into the receiving space of the receiving element, in such a way that a displacement of the securing element from the release position toward the locking position is prevented, the insertion element being adapted to interact with the at least one retaining element when the insertion element is inserted into the receiving space of the receiving element, in such a way that a displacement of the securing element from the release position into the locking position is enabled.

Thus, on the coupling according to the invention, it can be clearly recognized from the position of the securing element whether a fluid line connected to the insertion element is correctly connected to a fluid line connected to the receiving element. Preventing a displacement of the securing element from the release position to the locking position without the insertion element being in a predefined position can prevent a situation where the coupling gives the appearance of a correct connection, but is nevertheless not correctly connected.

Here it should be noted that the phrase "retaining element formed separately" means that the retaining element and securing element are formed separately at least in the locking position of the securing element on the receiving element. Indeed, it is entirely conceivable that the at least one retaining element and the securing element can also be initially connected as a single piece and separated when the insertion element is first inserted, for example by overcoming a predetermined breaking point.

The insertion axis may, for example, coincide with a longitudinal central axis of the receiving space and/or with a longitudinal central axis of the insertion element.

In one embodiment of the coupling according to the invention, the insertion element can be adapted to displace the at least one retaining element radially outwards at least partially when the insertion element is inserted into the receiving space of the receiving element. In this way, only the insertion force of the insertion element into the receiving space of the receiving element is increased in order to displace a respective portion of a retaining element, without any different actions being necessary in order to displace the respective portion of a retaining element.

The displacement axis of the securing element may be substantially perpendicular to the insertion axis of the insertion element. This can have the advantage that a rotationally symmetrical insertion element can be inserted into the receiving element in any rotational orientation and still engage with the securing element in a defined way.

In a further embodiment of the present invention, the securing element can be adapted to be transferable from a state separated from the receiving element into the receiving element provided with the at least one retaining element into the release position, the securing element being further adapted to displace the at least one retaining element over an insertion slope provided on the securing element. That is, a securing element manufactured separately from the receiving element can interact with the receiving element and the at least one retaining element during preparation for coupling or assembly of the receiving element with the securing element and the at least one retaining element in such a way that the securing element can be brought into the release position on the receiving element without using tools. At the same time, the insertion slope on the securing element can displace the at least one retaining element radially outwards, for example in the manner of a snap connection, in order to reach the release position. In particular, assembly of the receiving element with the securing element and the at least one retaining element may only be possible when no insertion element is inserted into the receiving element.

Advantageously, two retaining elements can be provided, being in particular diametrically opposed with respect to a longitudinal central axis of the receiving element, which are advantageously disposed on a common support element. In this way it is possible to strengthen the interaction of the securing element and the retaining element such that a displacement of the securing element from the release position to the locking position when the coupling is not correctly connected can be secured against even strong forces acting on the securing element which could, for example, overcome the interaction of the securing element with only one retaining element.

In particular, the at least one retaining element may be connectable to the receiving element parallel to the insertion axis. For example, the at least one retaining element can be inserted into a recess, such as a slot, of the receiving element, where it can be connected to the receiving element in a non-detachable manner, that is to say, it cannot be detached without damage.

The securing element can be designed as a closed ring whose through-hole extends in a direction parallel to the insertion axis when the securing element is in the release or the locking position. Thus, when the insertion element is inserted into the receiving element, the securing element cannot be displaced from the locking position beyond the release position, since the securing element at least partially surrounds the insertion element and abuts against it. It should also be noted that the term "ring" need not mean "circular" here, but merely that there is a structure enclosing a through-hole. Hence, the term "ring" is intended to include polygonal, e.g. rectangular, enclosed through-holes.

In a state in which the securing element is disposed on the receiving element, in particular in the locking position, a free space may be disposed between a portion of the securing element and a portion of the receiving element adjacent thereto in a direction parallel to the insertion axis, which free space is suitable for the insertion of a tool in order to displace the securing element from the locking position toward the release position, the portion of the securing element adjacent to the free space having in particular a recess facing the free space, which recess is adapted to receive the tool. For example, a screwdriver can be inserted into the free space and the securing element can be levered radially outwards with respect to the receiving element while being supported on the receiving element. Alternatively or in addition to the recess, a projection can be provided on the securing element under which the tool can engage. In particular, the projection can be disposed on a radially outer end of the securing element. In this case, the projection can be formed in conjunction with the free space in such a way that the securing element can be displaced out of the locking position by rotating the tool. Advantageously, the portion of the receiving element adjacent to the free space can be inclined relative to the insertion axis so that a tool, which is applied to an upper end of the slope thereby formed and displaced toward the securing element along the slope, can reach the securing element precisely under the projection.

Furthermore, for each retaining element, the securing element may have a recess disposed radially outwards on the securing element, which recess may be adapted to engage a respective retaining element in the release position of the securing element, such that displacement of the securing element along the displacement axis of the securing element in either direction is substantially prevented, "substantially" here meaning that a slight play, which cannot be avoided for manufacturing reasons, may be permitted.

Advantageously, each retaining element can have a projection extending radially inwards when connected to the receiving element. The projection can make contact with the insertion element and be forced radially outwards by it to release the securing element.

A portion of the projection extending furthest radially inwards is able to extend further radially inwards than a portion extending furthest radially inwards of an inner wall of the receiving space into which the projection extends, but is preferably able to be disposed further radially outwards than a portion extending furthest radially inwards of an inner wall of the through-hole of the securing element through which the insertion element is passed when the insertion element is connected to the receiving element. Therefore, the projection can only make contact with a predetermined portion of the insertion element and be displaced in a defined manner. Furthermore, this can facilitate insertion of the insertion element, since, until the projection makes contact with the portion of the insertion element provided for this purpose, there is no contact between the retaining element and the insertion element, which could make insertion of the insertion element into the receiving space more difficult.

The insertion element may have a portion on its outer circumference in which the outer diameter of the insertion element changes, the securing element further comprising a securing portion which is adapted to engage with the portion of the insertion element with changed outer diameter in the locking position of the securing element in order to prevent axial displacement of the insertion element in at least one direction, preferably a release direction of the insertion element and the receiving element, along the insertion axis.

This engagement of the securing element with the insertion element secures the insertion element in a predefined position relative to the receiving element. It is also conceivable to grip around both sides of a ring on the outer circumference of the insertion element in order to provide securing of the insertion element in both axial directions, i.e. in a direction of further insertion into the receiving space of the receiving element and in a direction of release of the insertion element from the receiving element.

Each retaining element may include an arm extending parallel to the insertion axis and resilient in a radial direction with respect to the insertion axis. Displaceability of the retaining element, in particular of the projection of the retaining element, is thus provided in a simple manner.

The coupling may further include a latching device acting between the receiving element and the securing element. The latching device has, for example, two latching positions which correspond to the locking position and the release position of the securing element on the receiving element respectively. Correct latching of this latching device provides another means of checking for correct positioning of the securing element on the receiving element. Furthermore, this can prevent unintentional displacement of the securing element from the locking position to the release position.

In an advantageous embodiment of the present invention, the latching device may comprise a leaf spring, for example formed as a component separate from the receiving element or as a portion integral with the receiving element and made of metal or plastic, which may be disposed, for example, on an outer side of the receiving element. The leaf spring may engage with a predetermined portion of the securing element, such as a recess, to prevent displacement of the securing element from the locking position. In order to be able to release the securing element from the locking position, it may be necessary to displace the leaf spring out of engagement with the securing element, for example by pressing on a portion of the leaf spring separate from the engagement portion described above with a finger, for example. It is also conceivable that the leaf spring must be displaced in an analogous manner in order to reach the locking position of the securing element on the receiving element. A receiving portion of the receiving element for the leaf spring may be configured in such a way that unintentional actuation of the leaf spring is prevented or at least significantly reduced. This can be achieved, for example, by providing projections at least partially surrounding the receiving portion for the leaf spring.

The receiving space of the receiving element may be divided into a first receiving space and a second receiving space, the securing element being disposed between the first and second receiving spaces in its locking position and its release position, viewed in a direction along the insertion axis. The first receiving space can be the receiving space into which the insertion element is first inserted. The first receiving space may have an inner wall with a larger diameter compared to the second receiving space, with the projection of the at least one retaining element extending into the first receiving space. A ring of the insertion element may, for example, fit only into the first receiving space, but not into the second receiving space. Advantageously, a longitudinal central axis of the first receiving space may be coaxial with a longitudinal central axis of the second receiving space.

A smallest radial distance from a portion of the securing element in its release position to an extended longitudinal central axis of the second receiving space may be greater than or equal to a smallest radial distance from a portion of an inner wall of the second receiving space to the longitudinal central axis of the second receiving space, but a smallest radial distance from a portion of the securing element in its release position to an extended longitudinal central axis of the first receiving space may be smaller than or equal to a smallest radial distance from a portion of an inner wall of the first receiving space to the longitudinal central axis of the first receiving space. The insertion element can thus fit through the securing element into the second receiving space with a front, radially smaller portion, but abut against the securing element with a radially larger portion, e.g. a ring on the outer circumference, which fits into the first receiving space. The insertion element can thus assume a predefined position in which it cannot be displaced further into the receiving space of the receiving element, so that the securing element can reliably engage with the insertion element and secure it axially.

BRIEF DESCRIPTION OF THE SEVERAL VIEWS OF THE DRAWINGS

The present invention is described in greater detail below on the basis of an exemplary embodiment with reference to the accompanying drawings. These show the following.

DETAILED DESCRIPTION

Figure 1:
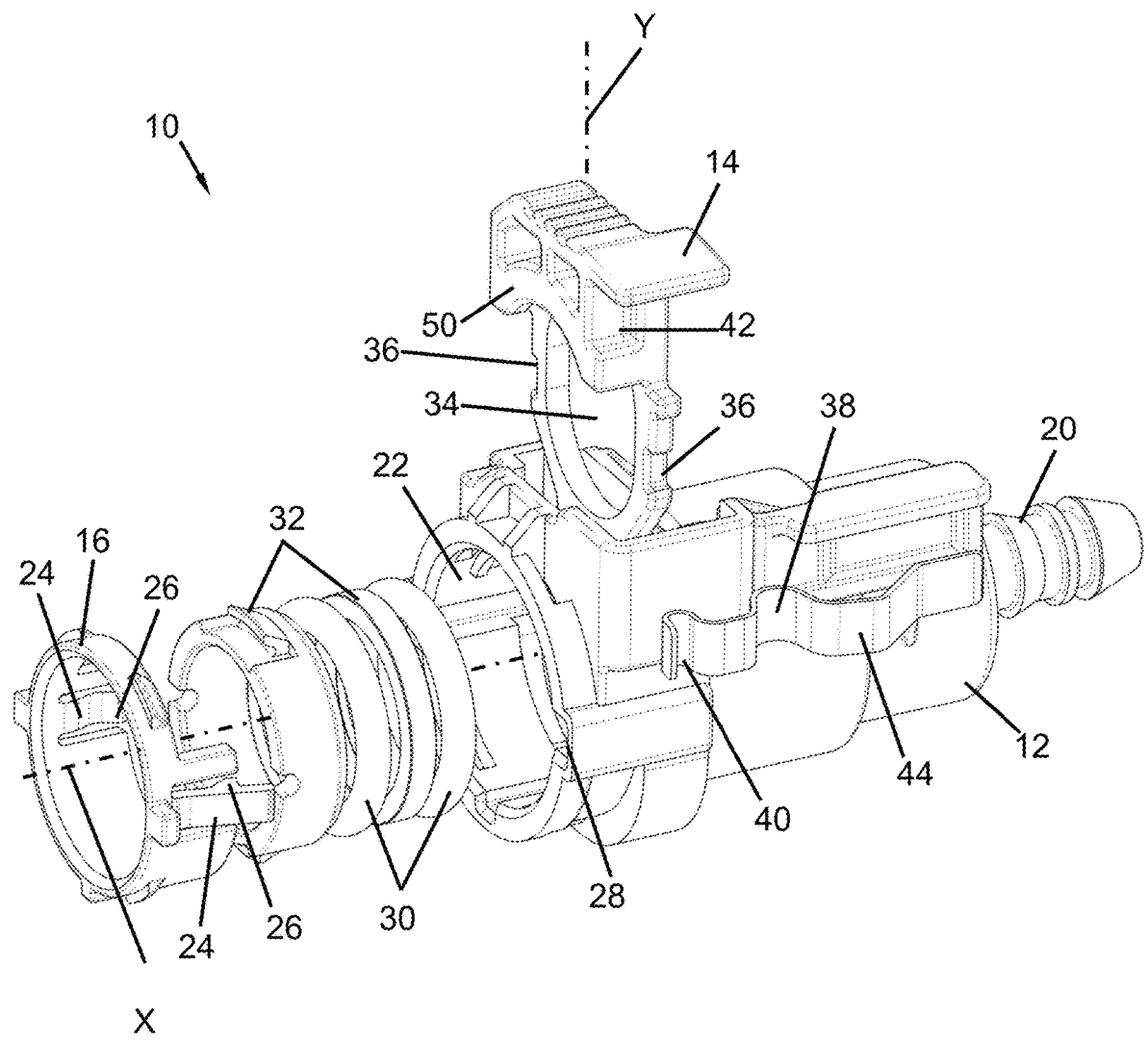
FIG. 1 a perspective exploded view of an embodiment of a coupling according to the invention.

In FIG. 1, a coupling according to the invention is generally designated by the reference number 10. The coupling 10 comprises a receiving element 12, a securing element 14, a retaining element 16 and an insertion element 18 (see FIG. 3a).

The receiving element 12 has a flange 20 at its end shown on the right in FIG. 1, which is adapted to be connectable to a fluid line. At its end opposite the flange 20, the receiving element 12 has a receiving space 22 into which the insertion element 18 can be inserted (see FIGS. 2a and 3a).

The retaining element 16 is designed here as a ring on which two radially resilient retaining arms 24 are disposed diametrically opposite to one another. Each of the retaining arms 24 has a radially inwards extending projection 26. The retaining arms 24 are received in the receiving element 12 in recesses 28 provided for this purpose. In the case of the annular retaining element 16, with the retaining element 16 connected to the receiving element 12, the receiving space 22 may also be considered to be defined by the through-opening of the retaining element 16.

In the embodiment illustrated in FIG. 1, the retaining element 16 as well as two O-rings 30 and two spacers 32 are connected to the receiving element 12 along an insertion axis X, which here also forms a longitudinal central axis X of the receiving element 12 or of the receiving space 22.

The securing element 14 is shown in FIG. 1 in a position disengaged from the receiving element 12 and can be introduced into the receiving element 12 along a displacement axis Y. In the exemplary embodiment illustrated here, the displacement axis Y is orthogonal to the insertion axis X. The securing element 14 has a through-hole 34 into which the insertion element 18 can be inserted and which is here fully enclosed by the securing element 14. In two diametrically opposed portions, the securing element 14 has two recesses 36 on its outer side, which are adapted to engage with the retaining arms 24 in a release position P1 (see FIG. 2b).

Figure 3A:
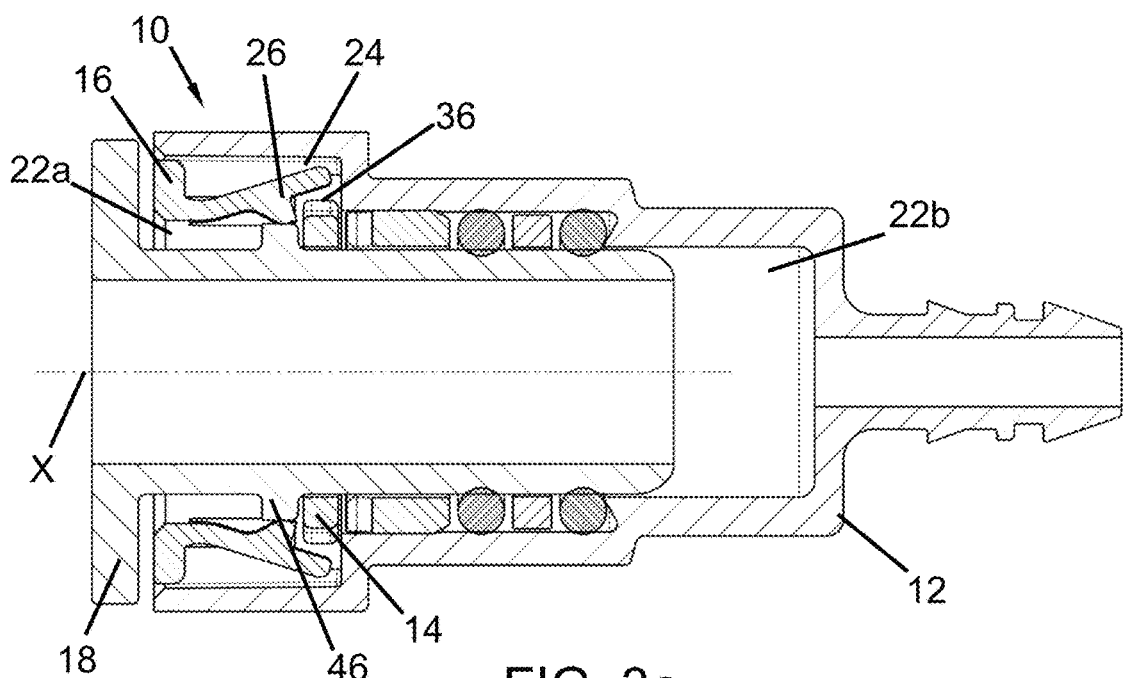
FIG. 3a a side cross-sectional view of the embodiment in FIG. 1 with the insertion element inserted.
Figure 3B:
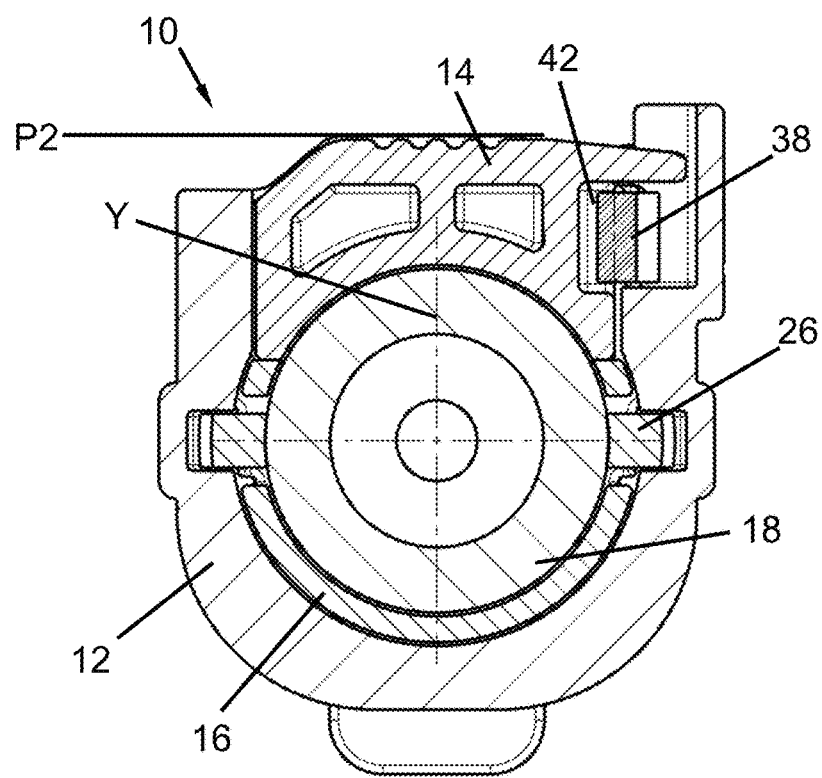
FIG. 3b a further side cross-sectional view of the embodiment in FIG. 1 with the insertion element inserted.

A leaf spring 38 is further disposed on the receiving element 12, the leaf spring 38 having an end portion 40 adapted to engage with a recess 42 of the securing element 14 in order to prevent displacement of the securing element 14 relative to the receiving element 12 in a locking position P2 (see FIG. 3b). The leaf spring 38 further comprises an actuating portion 44 which is formed here as at least one bend of the leaf spring, such that displacement of the actuating portion 44 onto the receiving element 12 causes displacement of the end portion 40 of the leaf spring 38 out of the recess 42 of the securing element 14.

Figure 2A:
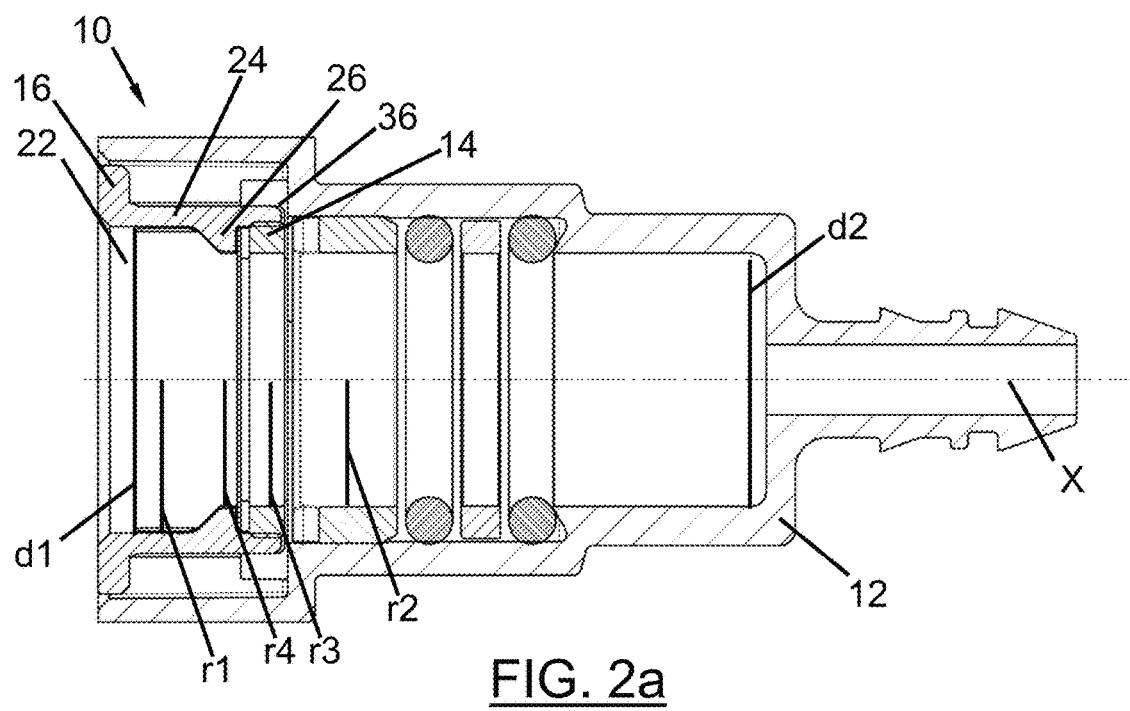
FIG. 2a a side cross-sectional view of the embodiment in FIG. 1 without the insertion element inserted.

FIG. 2a shows a side cross-sectional view of the embodiments of a coupling 10 according to the invention shown in FIG. 1 in the assembled state, with the exception of the insertion element 18. It can be seen that the resilient retaining arms 24 engage with the recesses 36, preventing displacement of the securing element 14 from the release position P1 shown in FIG. 2b relative to the receiving element 12.

FIG. 3a shows a cross-sectional view analogous to FIG. 2a, with the insertion element 18 inserted into the receiving space 22 of the receiving element 12. Here, an annular protruding portion 46 of the insertion element 18 has made contact with the projections 26 of the resilient retaining arms 24 of the retaining element 16 and has displaced the resilient retaining arms 24 radially outwards. The annular projection 46 of the insertion element 18 is located in a first receiving space 22a, whereas a front end portion of the insertion element 18 is inserted through the securing element 14 into a second receiving space 22b, which has a smaller inner diameter d2 compared to an inner diameter d1 of the first receiving space 22a, so that the insertion element 18 can be inserted into the receiving space 22 until the annular projection 46 abuts against the securing element 14. In other words, the first receiving space 22a has a smallest radial distance r1 from the longitudinal central axis X, the second receiving space 22b has a smallest radial distance r2 from the longitudinal central axis X, and the wall surrounding the through-hole 34 of the securing element 14 has a smallest radial distance r3 from the longitudinal central axis X. In the undisplaced state, i.e. with the insertion element not inserted, the projections 26 project into the first receiving space 22a up to a radial distance r4 from the longitudinal central axis X.

Figure 2B:
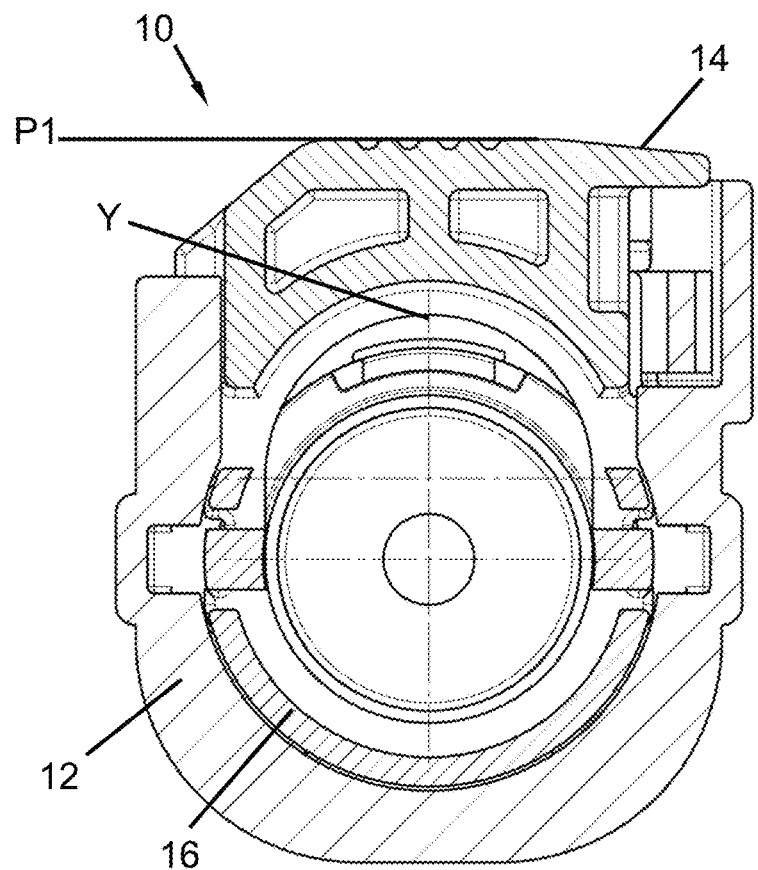
FIG. 2b a further side cross-sectional view of the embodiment in FIG. 1 without the insertion element inserted.

In FIG. 3a, the resilient retaining arms 24 are disengaged from the recesses 36 of the securing element 14, so that the securing element 14 can be displaced from the release position P1 shown in FIG. 2b to a locking position P2 shown in FIG. 3b.

In the locking position P2 shown in FIG. 3b, the annular projection 46 of the insertion element 18 is partially embraced by a locking portion 50 of the securing element 14, thereby preventing displacement of the insertion element along the axis X. Naturally it is conceivable also to secure the insertion element 18 against rotation relative to the securing element 14 or the receiving element 12. In the locking position P2, with the leaf spring 38 unactuated, the end portion 40 of the leaf spring 38 engages in the corresponding recess 42 of the securing element 14.

Figure 4:
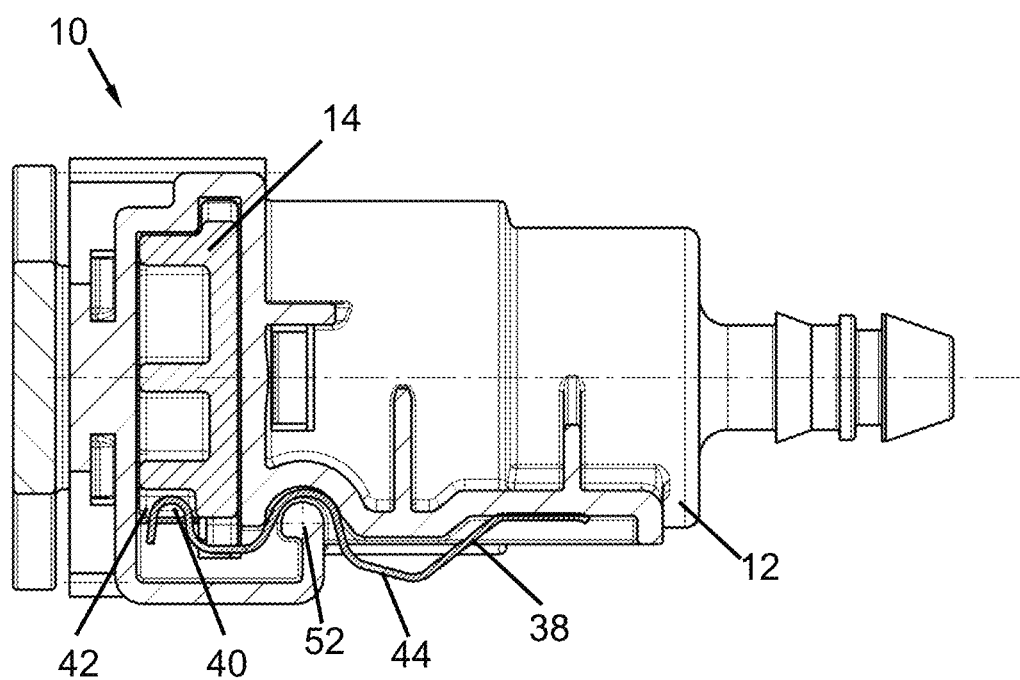
FIG. 4 a cross-sectional view of the embodiment in FIG. 1 showing a latching device of the securing element with the receiving element.

FIG. 4 shows a cross-sectional view illustrating the interaction of the leaf spring 38 with the receiving element 12 and the securing element 14. It can be seen that a displacement of the actuating portion 44 of the leaf spring 38 onto the receiving element 12 causes a displacement of the end of the leaf spring 38 opposite to the end portion 40 of the leaf spring 38, shown on the right in the illustration of FIG. 4, causing a rotation of the end portion 40 of the leaf spring 38 in and along a receiving portion 52 of the receiving element 12 in which the leaf spring 38 is mounted, so that the end portion 40 is displaced out of the recess 42 of the securing element 14.

Figure 5:
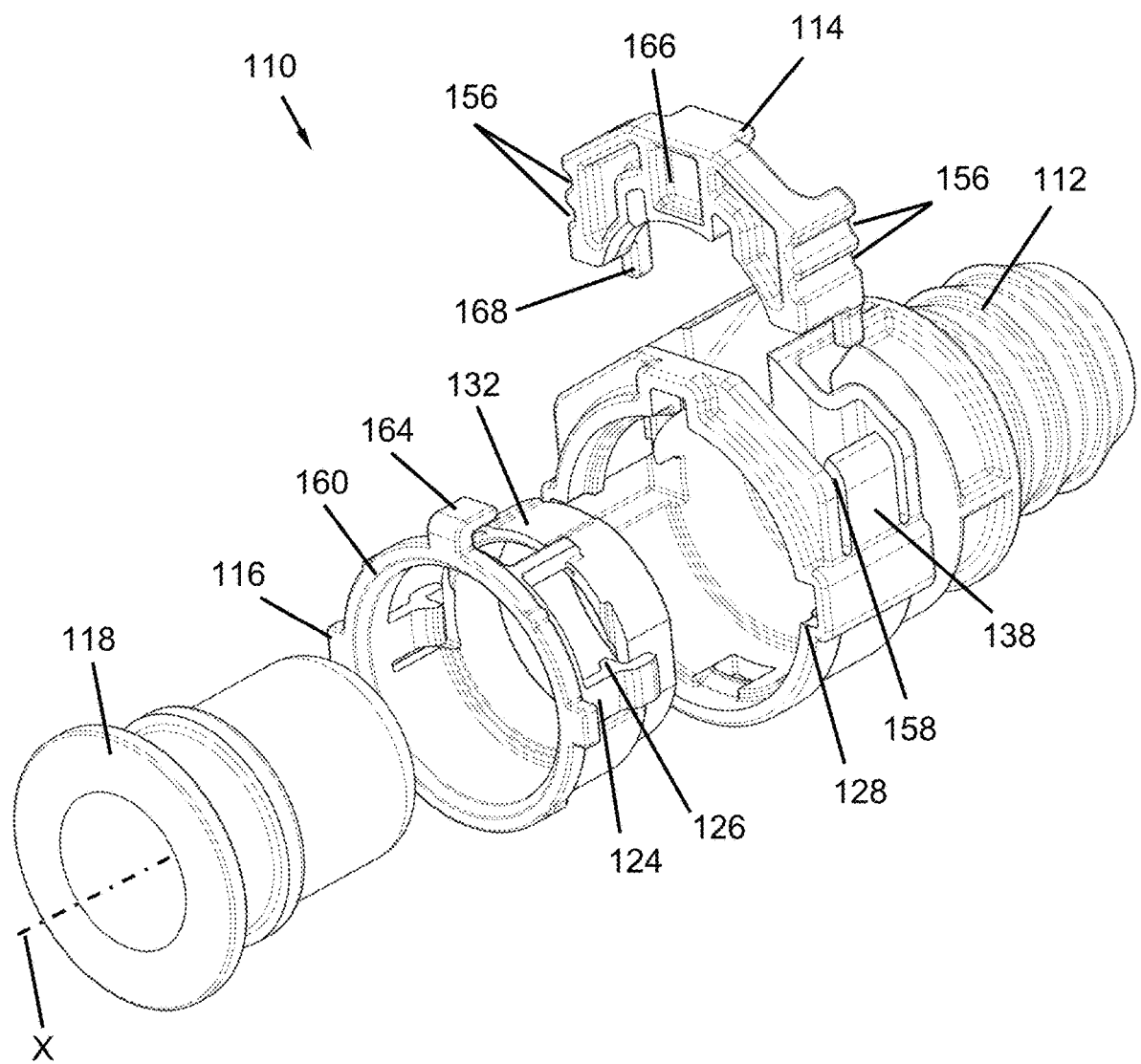
FIG. 5 a perspective exploded view of a further embodiment of a coupling according to the invention.

FIG. 5 now shows a further embodiment 110 of a coupling according to the invention, the differences between the embodiment 110 and the coupling 10 described above being discussed below. For this reason, in the description of coupling 110, components similar to those of coupling 10 are designated with the same reference numbers, but increased by 100. To the extent applicable, any features, effects, and advantages described with respect to coupling 10 may also apply to coupling 110, and vice versa.

The coupling 110 comprises a receiving element 112, a securing element 114, a retaining element 116 and an insertion element 118.

In its state connected to the receiving element 112, i.e. in the release position P1 or the locking position P2, the securing element 114 is connected to the receiving element 112 via a latching mechanism 138. The securing element 114 may include at least one pair (or, as in the embodiment illustrated in FIG. 5, two pairs) of indentations 156. The indentations 156 are adapted to engage a resiliently mounted latch projection 158 disposed on the receiving element 112. The lower indentations 156 of the pair of indentations 156 shown in FIG. 5 are associated with the release position P1 of the securing element 114 on the receiving element 112, and the higher indentations 156 are associated with the locking position P2. A distance from a center of an upper indentation 156 to a center of a lower indentation 156, that is to say, the 'travel' of the securing element 114 from the release position P1 to the locking position P2, may be approximately 3 mm.

Here, the securing element 114 may be essentially U-shaped in two sectional planes disposed perpendicular to one another, so that the securing element 114 may engage with the receiving element 112 in only a single orientation relative thereto.

Once the securing element 114 is connected to the receiving element 112 in the release position P1, the retaining element 116 can be introduced into the receiving element 112. In the embodiment illustrated in FIG. 5, the retaining element 116 is integrally formed with an annular spacer 132 which is adapted to hold a sealing element 130 (see FIGS. 6 and 7) in a predetermined position after it has been inserted into the receiving element 112. The spacer 132 is connected via webs to an annular portion 160 of the retaining element 116, the inner diameter of which is larger than the inner diameter of the spacer 132.

The annular portion 160 of the retaining element 116 is connected to at least one retaining arm 124 (in the illustrated embodiment, a second retaining arm 124 is diametrically opposed to the illustrated retaining arm 124 (see FIG. 7)), such that a projection 126 disposed on the retaining arm 124 is resiliently supported relative to the annular portion 160 of the retaining element 116. When the retaining element 116 is inserted into the receiving element 112, the retaining arms 124 engage recesses 128 provided on the receiving element 112. This prevents the retaining element 116 from rotating relative to the receiving element 112. With the retaining element 116 correctly positioned on the receiving element 112, a detent 162 of the retaining element 116 may engage with a corresponding recess formed on the receiving element 112 to prevent displacement of the retaining element 116 along the insertion axis X in a direction opposite to the direction of insertion into the receiving element 112.

Here, the retaining element 116 further comprises a projection 164 extending from the annular portion 160 toward the spacer 132 of the retaining element 116, the projection 164 engaging a recess 166 of the securing element 114 when the retaining element 116 is connected to the receiving element 112, thereby preventing displacement of the securing element 114 radially outwards from the release position P1, that is, disengagement of the securing element 114 from the receiving element 112 beyond the release position P1.

Two studs 168 are disposed on the securing element 114 which are adapted to abut against the retaining arms 124 of the retaining element 116 in response to a force pressing the securing element 114 from the release position P1 toward the locking position P2 without the insertion element 118 having been correctly introduced, in order to prevent the securing element 114 from reaching the locking position P2 before the insertion element 118 has been correctly introduced.

Figure 6:
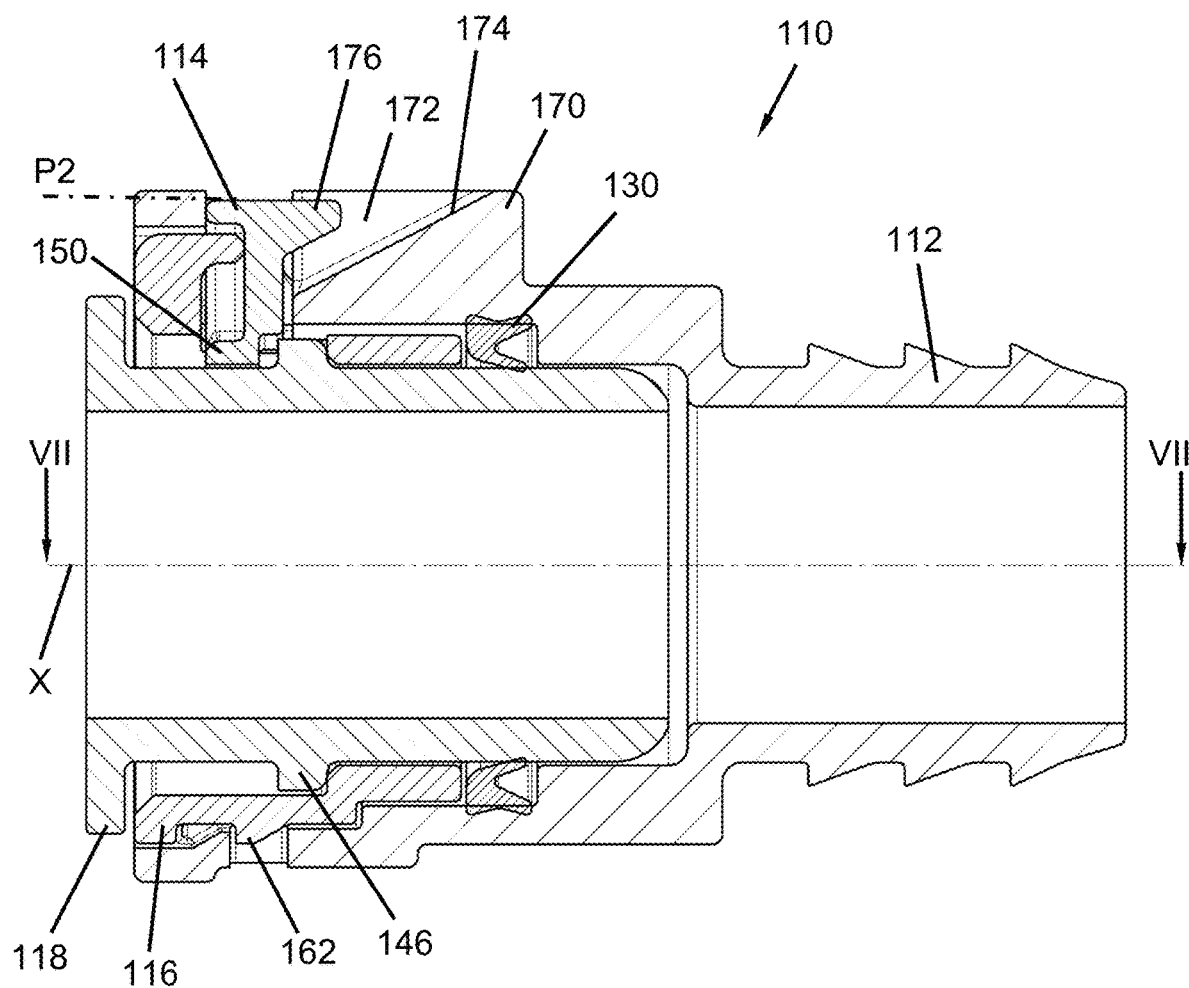
FIG. 6 a side cross-sectional view of the further embodiment of the coupling according to the invention in FIG. 5, taken along the line VI-VI in FIG. 7.
Figure 7:
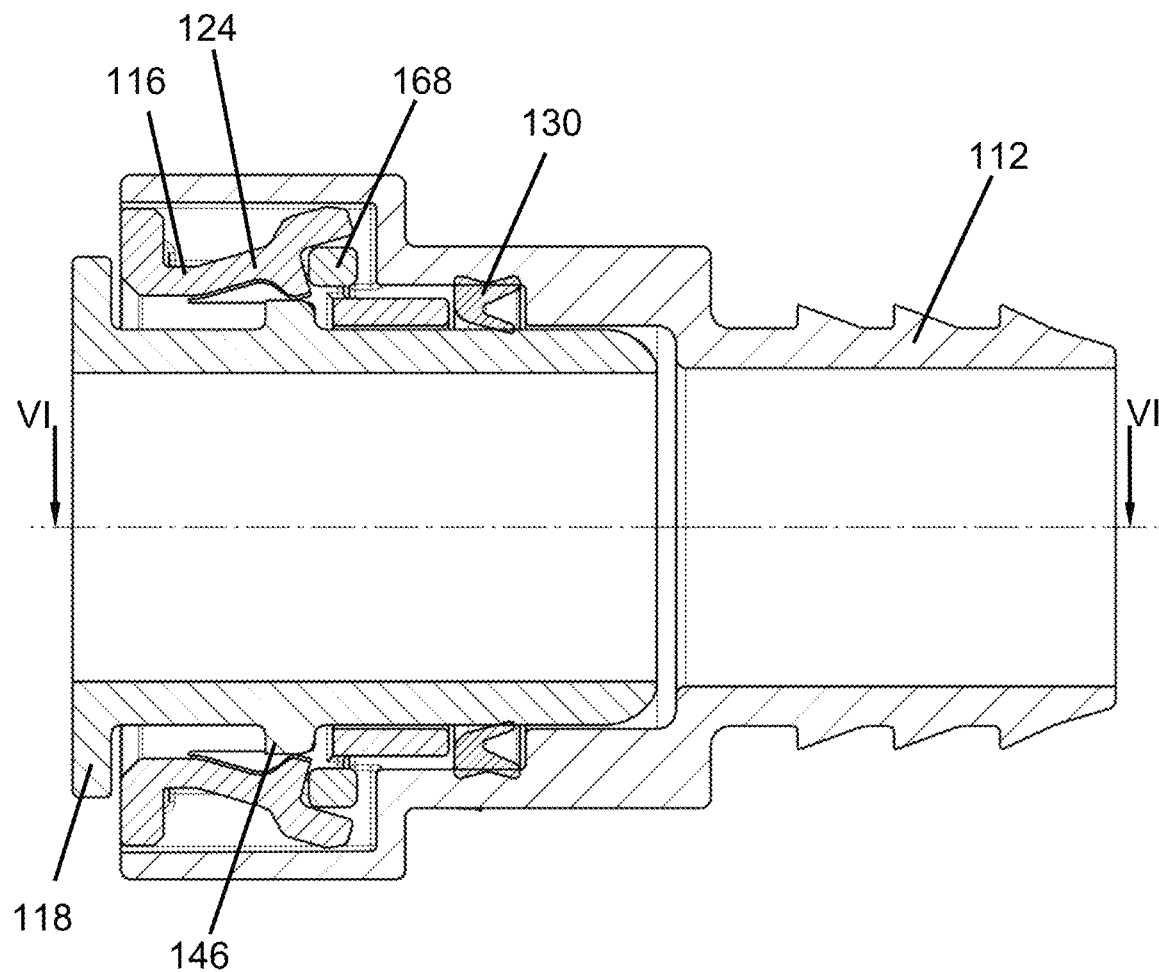
FIG. 7 a further side cross-sectional view of the further embodiment of the coupling according to the invention in FIG. 5, taken along the line VII-VII in FIG. 6.

FIGS. 6 and 7 show the insertion element 118 introduced into the receiving element 112 until it meets a stop, which may be formed, for example, by the interaction of an annular projecting portion 146 of the insertion element 118 with a portion of the retaining element 116, in particular the portion of the retaining element 116 forming the spacer 132, and/or with the retaining arms 124, in particular by displacement of the latter into contact with the receiving element 112 (see FIG. 7). In this case, the retaining arms 124 are displaced radially outwards from the annular projection 146 of the insertion element 118 in such a way that the studs 168 of the securing element 114 can be displaced past the retaining arms 124, i.e. so that the securing element 114 can be displaced from the release position P1 to the locking position P2, as shown in FIG. 6.

In the locking position P2, a securing portion 150 of the securing element 114 engages behind the annular projection 146 of the insertion element 118 in order to prevent displacement of the insertion element 118 along the insertion axis X in a direction opposite to the direction of insertion of the insertion element 118 into the receiving element 112.

FIG. 6 further shows that a free space 172 is formed between the securing element 114 and a portion 170 of the receiving element 112. The free space 172 is configured to allow insertion of a tool, such as a screwdriver, to enable the securing element 114 to be displaced from the locking position P2 toward the release position P1. The tool may be supported by the portion 170 of the receiving element 112 to allow the securing element 114 to be levered upwards in the view shown in FIG. 6, for example, by rotating the tool. To enable the tool to be guided accurately to a predetermined location on the securing element 114, the portion 170 of the receiving element 112 is formed with a slope 174 along which the tool can slide. To ensure better engagement of the tool on the securing element 114, the securing element 114 is provided with a projection 176 facing the free space 172.

The invention claimed is:

1. A coupling comprising:
a receiving element,
a securing element,
at least one retaining element formed separately from the securing element, and
an insertion element,
wherein the insertion element is insertable into a receiving space of the receiving element along an insertion axis,
wherein the at least one retaining element includes a projection that, when connected to the receiving element, extends radially inwards into the receiving space, wherein a first portion of the projection extends further radially inwards than a second portion of the projection with respect to an inner wall of the receiving space,
wherein the at least one retaining element includes a retaining arm extending parallel to the insertion axis, the retaining arm being resilient in a radial direction with respect to the insertion axis,
wherein the retaining arm has a supported end and a free end, the supported end being resiliently connected to the at least one retaining element and the free end being opposite the supported end with respect to the insertion axis, the free end being received longitudinally deeper within the receiving element than the supported end,
wherein the securing element is adapted to be displaceable along a displacement axis between a release position and a locking position,
wherein the securing element is adapted to engage with the at least one retaining element in its release position, without the insertion element inserted into the receiving space of the receiving element, in such a way that a displacement of the securing element from the release position in a direction of the locking position is prevented,
wherein the insertion element is adapted to interact with the at least one retaining element when the insertion element is inserted into the receiving space of the receiving element, in such a way that a displacement of the at least one retaining element from the release position into the locking position is enabled.

2. The coupling according to claim 1,
wherein the insertion element is adapted to displace the at least one retaining element radially outwards at least partially when the insertion element is inserted into the receiving space of the receiving element.

3. The coupling according to claim 1,
wherein the displacement axis of the securing element is substantially perpendicular to the insertion axis of the insertion element.

4. The coupling according to claim 1,
wherein the securing element is adapted to be transferable from a state separated from the receiving element into the receiving element provided with the at least one retaining element into the release position, the securing element being further adapted to displace the at least one retaining element over an insertion slope provided on the securing element.

5. The coupling according to claim 1, wherein an additional retaining arm is provided, wherein the retaining arm and the additional retaining arm are diametrically opposed, with respect to a longitudinal central axis of the receiving element.

6. The coupling according to claim 5, wherein the diametrically opposed retaining arms are disposed on a common support element.

7. The coupling according to claim 1,
wherein the at least one retaining element is connectable to the receiving element parallel to the insertion axis.

8. The coupling according to claim 1, wherein, in a state in which the securing element is disposed on the receiving element, in particular in the locking position, a free space is disposed between a portion of the securing element and a portion of the receiving element adjacent thereto in a direction parallel to the insertion axis, the free space being suitable for an insertion of a tool in order to displace the securing element from the locking position into the release position, the portion of the securing element adjacent to the free space having a recess facing the free space, the recess being adapted to receive the tool.

9. The coupling according to claim 1,
wherein, for each of the at least one retaining element, the securing element has a recess disposed radially outwards on the securing element that is adapted to engage a respective retaining element in the release position of the securing element, such that displacement of the securing element along the displacement axis of the securing element in either direction is substantially prevented.

10. The coupling according to claim 1,
wherein the insertion element has a portion on its outer circumference in which an outer diameter of the insertion element changes, the securing element further comprising a securing portion which is adapted to engage with the portion of the insertion element with changed outer diameter in the locking position of the securing element, in order to prevent axial displacement of the insertion element in at least one direction.

11. The coupling according to claim 10,
wherein the prevented axial displacement of the insertion element is prevented in a release direction of the insertion element and the receiving element, along the insertion axis.

12. The coupling according to claim 1,
wherein the coupling further comprises a latching device acting between the receiving element and the securing element.

13. The coupling according to claim 1,
wherein the receiving space of the receiving element is divided into a first receiving space and a second receiving space, the securing element being disposed between the first and second receiving spaces in the locking position and the release position, viewed in a direction along the insertion axis.

14. The coupling according to claim 13, wherein a smallest radial distance from a portion of the securing element in the release position to an extended longitudinal central axis of the second receiving space is greater than or equal to a smallest radial distance from a second portion of the inner wall for the second receiving space to the extended longitudinal central axis of the second receiving space, but a smallest radial distance from the portion of the securing element in the release position to an extended longitudinal central axis of the first receiving space is smaller than or equal to a smallest radial distance from a first portion of the inner wall for the first receiving space to the extended longitudinal central axis of the first receiving space.

15. The coupling according to claim 1, wherein the first portion of the projection extending furthest radially inwards is disposed further radially outwards than a third portion of the projection extending furthest radially inwards of an inner wall of a through-hole of the securing element through which the insertion element is passed when the insertion element is connected to the receiving element.

\* \* \* \* \*